United States Patent [19]

Takemoto

[11] Patent Number: 5,105,278
[45] Date of Patent: Apr. 14, 1992

[54] AUTOMATIC FOCUS-ADJUSTING APPARATUS USING TWO-DIMENSIONAL FREQUENCY COMPONENT OF AN IMAGE

[75] Inventor: Hiroshi Takemoto, Yokohama

[73] Assignee: Ricoh Company, Ltd., Tokyo, Japan

[21] Appl. No.: 640,882

[22] Filed: Jan. 14, 1991

[30] Foreign Application Priority Data

Jan. 19, 1990 [JP] Japan ..................................... 2-8341

[51] Int. Cl.⁵ ............................................. H04N 5/232
[52] U.S. Cl. .................................... 358/227; 358/228; 354/402
[58] Field of Search .............. 358/227, 228, 209, 135; 354/400, 402, 404, 408; 364/725

[56] References Cited

U.S. PATENT DOCUMENTS 4,541,012 9/1985 Tescher .............................. 358/135
4,975,726 12/1990 Kuga et al. ......................... 354/402

FOREIGN PATENT DOCUMENTS 62-146081 6/1987 Japan .
63-174476 7/1988 Japan .

OTHER PUBLICATIONS

Article by: Chen et al.; "Scene Adaptive Coder", IEEE, Transactions on Communications, vol. COM-32, No. 3, Mar. 1984.

Primary Examiner—James J. Groody
Assistant Examiner—Glenton B. Burgess
Attorney, Agent, or Firm—Oblon, Spivak, McClelland, Maier & Neustadt

[57] ABSTRACT

An automatic focus-adjusting apparatus has an image pickup device for converting optical information of the image of a photographed object formed on an image pickup face of an image pickup element through a lens to an electric signal; an A/D converter for converting the converted electric signal to a digital signal; a memory for temporarily storing the digital signal every frame; an encoder for performing a two-dimensional orthogonal transformation in a frequency region with respect to an image formed by using the digital signals and detecting a magnitude of each of frequency components provided from this image; a focus detector for detecting the amplitude of a high frequency component specified from the respective frequency components; and a lens moving device for adjusting a position of the lens by a control signal transmitted from the focus detector. A focusing position of the lens is provided by adjusting the position thereof such that the amplitude of the specified high frequency component is maximum.

5 Claims, 4 Drawing Sheets

Fig. 4

| j \ i | 1 | 2 | 3 | 4 | 5 | 6 | 7 | 8 |
|---|---|---|---|---|---|---|---|---|
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |

AUTOMATIC FOCUS-ADJUSTING APPARATUS USING TWO-DIMENSIONAL FREQUENCY COMPONENT OF AN IMAGE

BACKGROUND OF THE INVENTION

1. Field of the Invention

The present invention relates to an automatic focus-adjusting apparatus for detecting the focusing position of a lens by analyzing a frequency component provided from an image in a video camera, a still camera, etc. and automatically adjusting a focus of the lens.

2. Description of the Related Art

In a known automatic focus-adjusting apparatus, a specified frequency component is selected from a video signal outputted from an image pickup element in a video camera, a still camera, etc. The focus of a lens is adjusted by moving the lens forward or backward such that this specified frequency component is maximum.

In this automatic focus-adjusting apparatus, a lens system is considered to be a kind of a low-pass filter. An equivalent frequency band width with respect to a photographed object separated from the camera by a constant distance is changed by adjusting the focus of the lens. A change in amplitude of a high frequency component of the video signal close ot a cutoff frequency is detedted by the above change in band width to detect definition of a picture, thereby providing the focusing position of the lens. In this case, the amplitude of the high frequency component close to the cutoff frequency becomes maximum in a lens position in which an image formed by the lens is best. The amplitude of the high frequency component is reduced as a focal position of the lens is shifted from this best image forming position forward or backward.

Concretely, a signal having a specified high frequency component (for example, 1 MHz) is taken by using a band-pass filter out of the video signal provided by scanning an image in a horizontal direction. The position of the lens is adjusted to focus the lens such that an amplitude of this high frequency component is maximum. Such an automatic focus-adjusting apparatus is shown in e.g., Japanese Patent Application Laying Open (KOKAI) No. 62-146081.

In this system for detecting large or small values of the amplitude of the specified high frequency component provided through the band-pass filter, the video signal is obtained by sequentially scanning the image in the horizontal direction. Accordingly, the accuracy in focusing operation with respect to a vertical image is high, but the accuracy in focusing operation with respect to a horizontal image is low. Therefore, for example, it is impossible to preferably focus the lens with respect to an image having a transversally striped pattern such as blinds of a window.

The image has two-dimensional information, but is converted to a one-dimensional time series video signal by sequentially scanning the image in the horizontal direction. In the case of an image of the photographed object having a longitudinally striped pattern with edges in the horizontal direction, an obtained brightness signal includes an extremely high frequency component in a position indicative of this signal on a scanning line. It is possible to take a signal having the specified high frequency component out of this brightness signal through the band-pass filter. However, in the case of an image of the photographed object having a transversally striped pattern with edges in the vertical direction, an obtained brightness signal does not include many high frequency components. Accordingly, no high accuracy in focusing operation is obtained in a general system for providing the focusing position of the lens by monitoring an amplitude of the specified high frequency component.

SUMMARY OF THE INVENTION

It is therefore an object of the present invention to provide an automatic focus-adjusting apparatus in which a lens can be focused with high accuracy even in the case of a photographed object having edges only in the vertical direction such as a transversally striped pattern.

The above object of the present invention can be achieved by an automatic focus-adjusting apparatus comprising image pickup means for converting optical information of the image of a photographed object formed on an image pickup face of an imge pickup element through a lens to an electric signal; A/D converting means for converting the converted electric signal to a digital signal; memory means for temporarily storing the digital signal every frame; encoding means for performing a two-dimensional orthogonal transformation in a frequency region with respect to an image formed by using the digital signals and detecting a magnitude of each of frequency components provided from this image; focus detecting means for detecting the amplitude of a high frequency component specified from the respective frequency components; and lens moving means for adjusting a position of the lens by a control signal transmitted from the focus detecting means; a focusing position of the lens being provided by adjusting the position thereof such that the amplitude of the specified high frequency component is maximum.

In the automatic focus-adjusting apparatus of the present ivention, the orthogonal transformation such as a discreate cosine transformation is performed by the encoding means every frame with respect to image data of the photographed object to two-dimensionally analyze the image data with respect to frequency. The focusing position of the lens is provided by monitoring a change in amplitude of the specified frequency component.

Two-dimensional discrete cosine transformation coefficients respectively include frequency components with respect to horizontal and vertical directions of the image and frequency components with respect to a slanting direction of the image as a combination of the horizontal and vertical directions. Accordingly, when a specified transformation coefficient is selected from these transformation coefficients and a magnitude of this specified transformation coefficient is monitored, it is possible to improve the accuracy in focusing operation with respect to the photographed object having a transversally striped pattern including only frequency components with respect to a single direction, especially the horizontal direction.

In this case, an equivalent frequency band width with respect to the photographed object separated from the lens by a constant distance is changed by adjusting a focus of the lens. The specified transformation coefficient shows a high frequency component of a video signal close to a cutoff frequency and provided by the change in band width. A value of the specified transformation coefficient becomes maximum in a position in which a best image is formed by the lens. This coefficient value is reduced as the focusing position of the lens is shifted from the best image forming position forward or backward. Accordingly, the specified transformation coefficient is selected from the respective transformation coefficients with respect to the horizontal and vertical directions of the image. When the position of the lens is adjusted such that each value of the specified transformation coefficient is maximum, it is possible to provide the focusing position of the lens with high accuracy even in the case of an image providing only the frequency components with respect to the single direction.

Further objects and advantages of the present invention will be apparent from the following desription of the preferred embodiments of the present invention as illustrated in the accompanying drawings.

BRIEF DESCRIPTION OF THE DRAWINGS

FIG. 4 shows a table of an 8×8 matrix showing coefficients of a two-dimensional discrete cosine transformation.

DESCRIPTION OF THE PREFERRED EMBODIMENTS

The preferred embodiment of an automatic focus-adjusting apparatus in the present invention will next be described in detail with reference to the accompanying drawings.

Figure 1A:
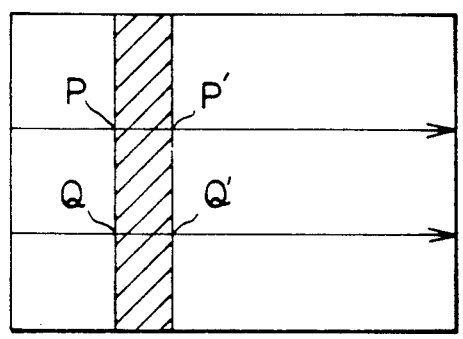
FIGS 1a and 1b are respectively a view of an image having a longitudinally striped pattern and a schematic view showing a waveform of a brightness signal obtained in the case of this image.
Figure 1B:
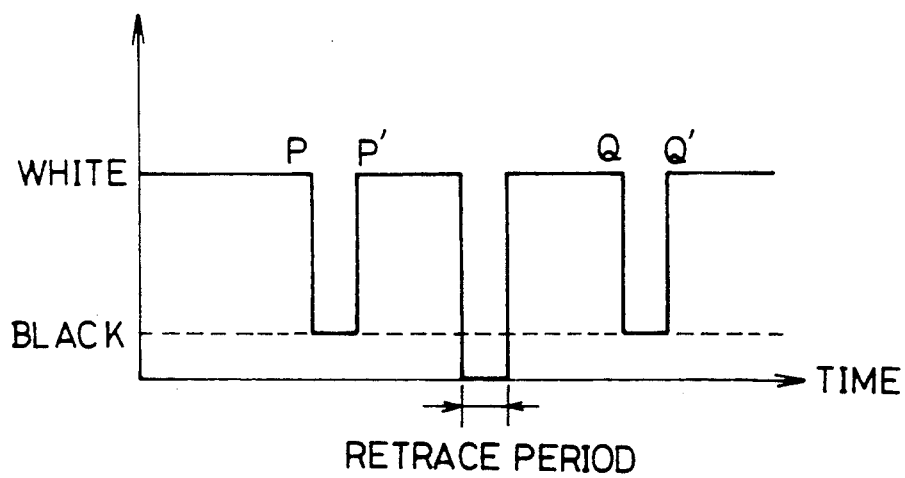
Figure 2A:
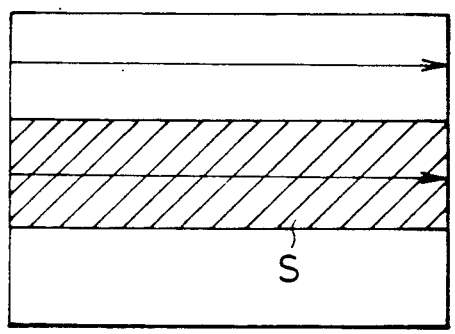
FIGS. 2a and 2b are respectively a view of an image having a trsnsversally striped pattern and a schematic view showing a waveform of a brightness signal obtained in the case of this image.
Figure 2B:
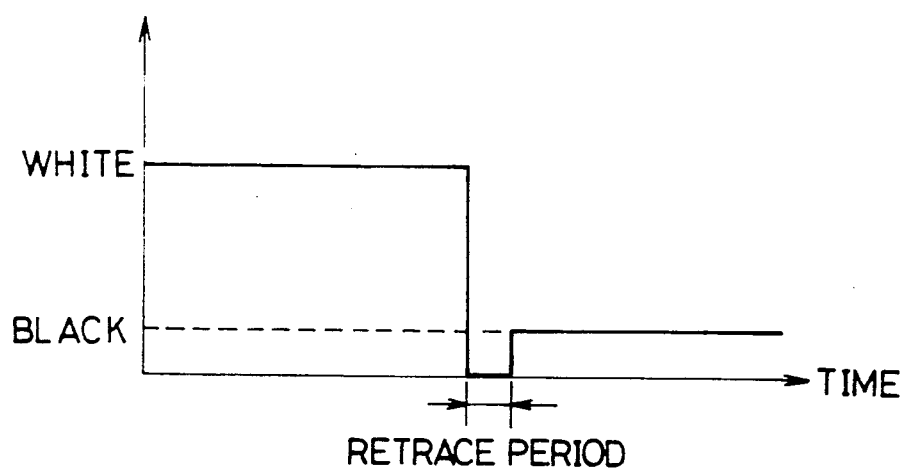

An image has two-dimensional information, but is converted to a one-dimensional time series video signal by sequentially scanning the image in a horizontal direction. FIG. 1a shows the image of a photographed object having a longitudinally striped pattern with edges in the horizontal direction. FIG. 1b shows a waveform of a brightness signal obtained in the case of such an image. As shown in FIGS. 1a and 1b, in the case of the image having a longitudinally striped pattern with edges in the horizontal direction, the obtained brightness signal includes an extremely high frequency component in each of positions P, P', Q and Q' of this signal on a scanning line. It is possible to take a signal having a specified high frequency component out of this brightness signal through a band-pass filter. FIG. 2a shows the image of a photographed object having a transversally striped pattern s with edges in a vertical direction. FIG. 2b shows a waveform of a brightness signal obtained in the case of such an image. As shown in FIGS. 2a and 2b, in the case of the image having a transversally striped pattern with edges in the vertical direction, the obtained brightness signal does not include many high frequency components. Accordingly, no high accuracy in focusing operation is obtained in a general system for providing the focusing position of a lens by monitoring an amplitude of the specified high frequency component.

Figure 3:
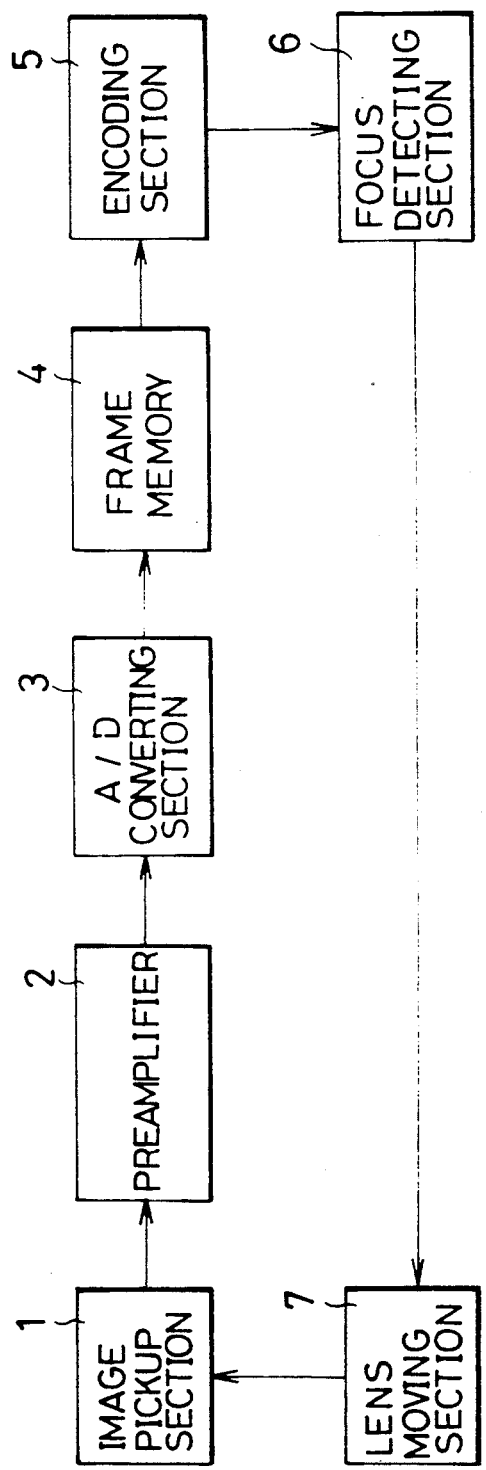
FIG. 3 is a block diagram of an automatic focus-adjusting apparatus in one embodiment of the present invention which the automatic focus-adjusting apparatus is applied to an electronic still camera.

FIG. 3 is a block diagram showing an automatic focus-adjusting apparatus in one embodiment of the present invention. In FIG. 3, this automatic focus-adjusting apparatus is applied to an electronic still camera.

The automatic focus-adjusting apparatus has an image pickup section 1, a preamplifier 2, an A/D converting section 3, a frame memory 4, an encoding section 5, a focus detecting section 6, ana a lens moving section 7. The image pickup section 1 has a solid-state image sensor such as a charge coupled device (CCD) for converting the image of a photographed object formed through a lens to an electric signal and outputting this electric signal to the preamplifier 2. The preamplifier 2 amplifies the electric signal outputted from this image pickup section 1. The A/D converting section 3 converts the amplified electric signal to a digital signal. The frame memory 4 temporarily stores the converted digital signal thereto. The encoding section 5 orthogonally converts and decomposes the digital signal stored to this frame memory 4 to respective frequency components in a frequency region. The focus detecting section 6 monitors a change in value of a high frequency component specified from the respective frequency components and detects a maximum value of this high frequency component. The lens moving section 7 moves the lens in the image pickup section 1 forward or backward.

Figure 4:
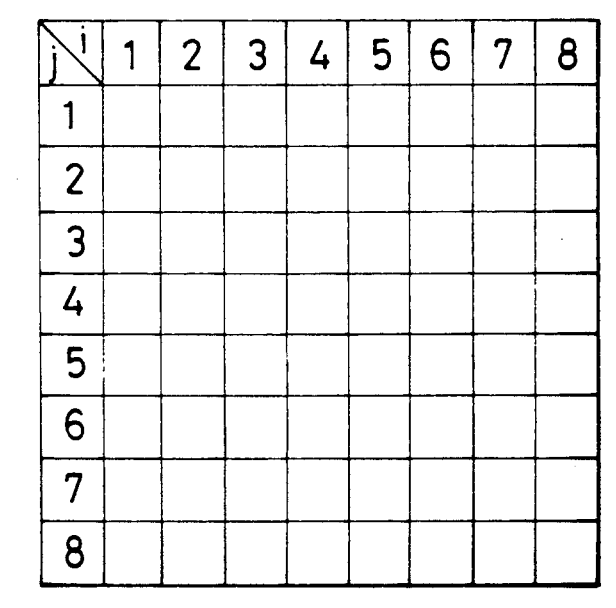

The encoding section 5 divides image data stored to the frame memory 4 into a plurality of data blocks each composed of n×n picture elements. The encoding section 5 performs a discrete cosine transformation (DCT) every data block to decompose the image data into the respective frequency components. For example, when a two-dimensional discrete cosine transformation is performed with respect to the image data of 8×8 picture elements in one data block, transformation coefficients $F_{ij}$ (i, j = 1, 2, - - -, 8) of an 8×8 matrix are obtained as shown in FIG. 4.

With respect to the transformation coefficients $F_{ij}$ of the 8×8 matrix, a leftmost and uppermost transformation coefficient shows the magnitude of a direct current component provided from the image. A transformation coefficient lower than this leftmost and uppermost transformation coefficient shows the magnitude of a high frequency component of a longitudinal wave. A transformation coefficient on the right-hand side of the leftmost and uppermost transformation coefficient shows the magnitude of a high frequency component of a transversal wave. Accordingly, the magnitudes of longitudinal and transversal waves and the magnitude of a combined wave thereof provided from the image can be simultaneously known from values of the transformation coefficients $F_{ij}$. In an international standardized system of an electronic still camera considered at the present time, these transformation coefficients $F_{ij}$ are quantized and are then Hafmann-encoded to compress data of the image.

The discrete cosine transformation coefficients $F_{ij}$ provided in the encoding section 5 are next inputted to the focus detecting section 6. The focus detecting section 6 monitors the magnitude of a specified high frequency component changed by moving the lens in the image pickup section 1. The focus detecting section 6 transmits a control signal to the lens moving section 7 so as to move the lens to a position in which the magnitude of the specified high frequency component is maximum. The lens moving section 7 receives this control signal and moves the lens and then stops the movement of the lens in the position in which the magnitude of the specified high frequency component is maximum.

Thus, a focusing position of the lens is detected by a closed loop formed from the image pickup section 1 to the lens moving section 7. The two-dimensional discrete cosine transformation coefficients $F_{ij}$ respectively include frequency components with respect to the horizontal and vertical directions of the image and frequency components with respect to a slanting direction of the image as a combination of the horizontal and vertical directions. Accordingly, it is possible to focus the lens with high accuracy even in the case of the photographed object having edges only in one direction by using the transformation coefficients $F_{ij}$.

As mentioned above, in accordance with the present invention, an image of the photographed object is two-dimensionally analyzed with respect to frequency and the change in amplitude of a specified frequency component is monitored to provide a focusing position of the lens. Accordingly, it is possible to improve the accuracy in focusing operation even in the case of the photographed object having a transversally striped pattern including only frequency components with respect to a single direction, especially the horizontal direction.

Further, since the encoding section for compressing image data is used, a circuit structure of the automatic focus-adjusting apparatus can be simplified and the focus-adjusting apparatus can be also applied to a camera having a low price.

Many widely different embodiments of the present invention may be constructed without departing from the spirit and scope of the present invention. It should be understood that the present invention is not limited to the specific embodiments described in the specification, except as defined in the appended claims.

What is claimed is:

1. An automatic focus-adjusting apparatus comprising:

image pickup means for converting optical information of the image of a photographed object formed on an image pickup face of an image pickup element through a lens to an electric signal;

A/D converting means for converting the converted electric signal to a digital signal;

memory means for temporarily storing said digital signal every frame;

encoding means for performing a two-dimensional orthogonal transformation in a frequency region with respect to an image formed by using said digital signals and detecting a magnitude of each of frequency components provide from this image;

focus detecting means for detecting the amplitude of a high frequency component specified from said respective frequency components; and lens moving means for adjusting a position of the lens by a control signal transmitted from said focus detecting means;

a focusing position of the lens being provided by adjusting the position thereof such that the amplitude of said specified high frequency component is maximum.

2. An automatic focus-adjusting apparatus as claimed in claim 1, wherein the orthogonal transformation is a discrete cosine transformation.

3. An automatic focus-adjusting apparatus as claimed in claim 1, wherein the encoding means performs the orthogonal transformation every frame with respect to image data of the photographed object.

4. An automatic focus-adjusting apparatus as claimed in claim 3, wherein a change in amplitude of the specified frequency component is monitored.

5. An automatic focus-adjusting apparatus as claimed in claim 1, wherein the encoding section compresses image data of the photographed object.

* * * * *